Patented Oct. 17, 1922.

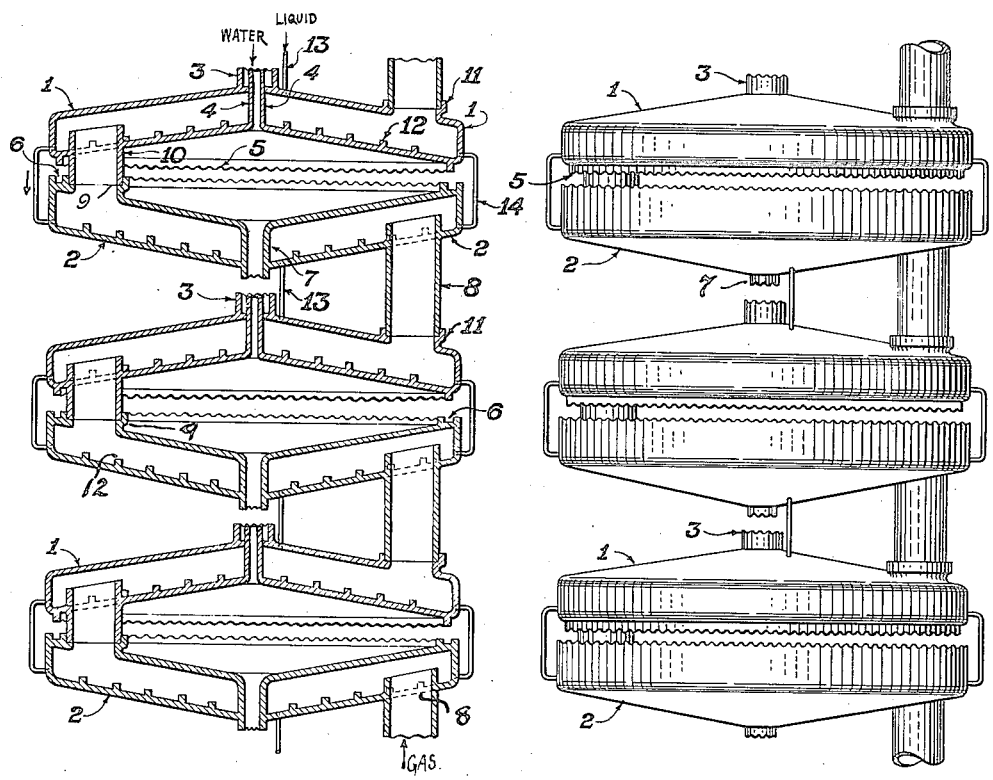

1,432,698

UNITED STATES PATENT OFFICE.

ARTHUR B. JONES, OF PLAINFIELD, NEW JERSEY, ASSIGNOR TO CLARK, MacMULLEN AND RILEY, A CORPORATION OF NEW YORK.

ABSORPTION AND COOLING APPARATUS.

Application filed February 18, 1921. Serial No. 445,914.

*To all whom it may concern:*

Be it known that I, ARTHUR B. JONES, a citizen of the United States, and resident of Plainfield, New Jersey, have invented a new and useful Absorption and Cooling Apparatus, and in order that others skilled in the art may make and use the same give the following specification, of which the accompanying drawing is part.
My invention relates to apparatus for cooling or condensing gases or vapors and also to cooling the same when brought into absorption- or reaction-contact with liquids together with means for bringing gases into such contact with liquids, such for example as in what are known as absorption towers used in the manufacture of acids and in chemical industry. The objects of my invention are to provide an apparatus of the character described but having important advantages both in construction and operation and to remove objections present in such apparatus as now known and used.

In absorption apparatus and processes now known and used a relatively large volume of liquid is required to be handled for the production of a relatively small quantity of product of the desired concentration or specific gravity. This is principally due to the character of absorption apparatus employed and the heat developed in the process, necessitating a low rate of absorption and the circulation of the liquid, such as acid, through a cooling system outside the absorbing apparatus or tower and its return to the tower,—this process being repeated till the desired concentration is reached. One object of my invention is to eliminate the separate or outside cooling system with its pumps and piping, and conduct the absorption and cooling at the same time in the same apparatus also increasing the rate of absorption. A further object is to employ the cooling water more effectively, whereby a less volume is required, and to eliminate splashing and waste. A further object is to construct my apparatus in units of the same form and construction so that they may be readily and economically manufactured, and an apparatus made of any desired capacity by assembling and connecting the requisite number of units, and also an apparatus may be reduced in size or capacity by disconnecting and removing one or more units. Other objects and advantages will appear in the following.

Figure 1 of the drawing represents a vertical sectional view of a number of units connected and assembled. Figure 2 represents a vertical elevation of the same.

My apparatus is constructed of a plurality of units, each unit being of the same construction, the size or capacity of the apparatus being determined by the number of units used. Each unit, so called, consists of a pair of hollow sections, 1 and 2, each of a conical or dome-like form. When assembled their bases are placed in juxtaposition so that the upper and lower walls of the upper section 1, incline downwardly and outwardly from the apex or centre, whereas the upper and lower walls of the lower section 2, incline downwardly and inwardly from the periphery to the centre, as will be understood from Figs. 1 and 2. The sections may be made of any suitable material such as keramic ware, stoneware or metal, by molding, casting or stamping; and as they are respectively of the same form and construction they may be made cheaply in quantity and standard sizes.

The upper section 1, is provided at the centre of its upper surface with a receptacle or cup 3, the lip or rim of which is serrated or indented, as shown. Extending into this cup from the lower face of the section is the tube 4, the upper end of which is below the level of the serrations in the rim. This central tube 4 is practically a continuation of the lower surface of the section. At its peripheral edge the section is formed with a downwardly extending flange 5, serrated or indented on its lower edge, the upper and lower surfaces of the section practically uniting to form this flange. The lower section 2 of a unit is formed on its upper peripheral edge with a trough 6, forming a circular channel that registers with flange 5 of upper section 1. Both walls of the trough or channel 6 are serrated or indented, as indicated. A central tube 7 is formed in section 2, which is practically a continuation of the upper surface thereof and which extends to and slightly beyond the lower surface of the section. It will be seen that the upper and lower surfaces of the section unite at the lower end of tube 7 at the centre of the section. The lower end of this tube is also preferably serrated, and as shown registers with cup 3 of section 1 of the unit next below.

The purpose of the construction so far described is that water or other cooling liquid, being supplied to the uppermost cup 3 at such rate as to keep said cup overflowing through the serrations in its rim, will flow by gravity in a film over the entire outer surfaces of the section, being distributed evenly by means of the indentations of the rim, passing down also through central tube 4 (the upper end of which is below the indentations) and flowing outwardly over the lower surface of the section to flange 5. The liquid thus flows over both upper and lower surfaces of the section and reunites at peripheral flange 5, from whence it falls into peripheral trough 6. Overflowing this trough through the indentations of both walls thereof, part of the liquid flows over the upper surface of section 2, through tube 7, the other part flowing outwardly from the trough downwardly and inwardly over the lower surface of the section, both parts reuniting at the lower end of tube 7, from whence it falls into cup 3 of the unit next below. The flow described is repeated over each unit in succession. By the construction described it will be seen that each section of each unit is completely surrounded with a flowing envelope or film of cooling liquid, thus utilizing both gravity flow and the cooling effect of the liquid to the best advantage, with the minimum quantity of liquid and without objectionable splashing or waste.

The gas or vapor to be condensed or cooled is introduced to the interior of the hollow sections and caused to pass from one to the other, preferably in a counter-flow direction to that of the cooling liquid. Each section is provided with a gas inlet and outlet for this purpose. In the lower sections 2, the gas inlet is shown in the form of tubular or pipe extension 8 in the under side thereof, the upper interior end of which projects somewhat above the lower interior surface. The gas outlet of said section is shown in the form of a flanged opening 9 in the upper wall thereof and preferably on the side laterally opposite inlet 8. In upper sections 1, the gas inlet and outlet openings are similarly formed and arranged; that is, the gas inlet is in the form of a pipe extension 10 in the under side thereof, with its upper interior end somewhat above the lower interior surface of the section. The gas outlet of sections 1 is in the form of a flanged opening 11 in the upper wall thereof and preferably laterally opposite inlet 10. In assembling the sections, as will be seen from Fig. 1, the lower end of inlet extension 10 fits or engages the flanged outlet opening 9 of the lower section. In similar manner the units are connected, the lower end of gas inlet extension 8 of a lower section engaging and fitting the flanged outlet 11 of the upper section 1 of the unit next below. It will be understood that the joints or connections between the units and sections will be made gas tight by sealing or luting. From the construction described it will be seen that the gas or vapor to be condensed or cooled, led into the bottom section, will circulate through that section and all the superposed sections in succession, and will be subjected throughout its course to the cooling action of the water or other cooling liquid flowing over the entire exterior surfaces, both top and bottom, and also of the tubular or pipe connections 8 and 10 as well as the central tubes 4 and 7. The gas entering and passing through the cooled interior space of the several sections is rapidly cooled, particularly as it comes in contact with the walls and tubes, to the outer surfaces of which the cooling liquid is directly and constantly supplied.

To provide for absorbing the gas or vapor in a liquid, or for bringing them into reaction contact with one another, (as, for example, in absorbing sulphur trioxide in sulphuric acid), I provide the lower interior surface of each of the sections 1 and 2 with ribs or riffles 12, shown as concentrically arranged and spaced apart. The acid, or other absorbing liquid, is introduced to the interior of the uppermost section 1, through an inlet pipe 13, near the centre or adjacent cup 3, so as to deliver the acid to the central part or apex of the lower interior surface. From this point the acid flows around central tube 4 until it overflows the first rib or riffle 12 and then similarly over each succeeding rib in sccession to the periphery. The periphery of the upper sections 1 is connected to that of the lower sections 2 at any desired number of points by pipes 14, through which the acid passes to the periphery of the lower interior surface of sections 2. From these peripheral points the acid flows downwardly and inwardly over the ribs 12 in succession to the centre. The centre of the lower sections is connected to the centre of the upper sections next below by acid outlet pipe 13 (corresponding to acid inlet pipe similarly numbered before referred to.) The acid flows through the succeeding sections and units in the manner described. The gas inlet pipes 8 and 10, having their upper ends projecting above the lower interior surfaces of the sections, as described, the acid does not overflow into the gas connections.

The construction and arrangement described provides the most favorable conditions for the absorption or reaction of the gas with the acid or other liquid under treatment since the succession of downwardly and inwardly and outwardly sloping surfaces presents a large surface of liquid constantly exposed to the gas and flowing in a counter direction thereto. The surface of the acid is constantly broken and changed by the ribs, presenting new surfaces constantly to contact with the gas, so that absorption or reaction, which is mainly a surface action, takes place rapidly. Also the film of acid is in contact with the floor of the sections that are directly cooled by the water flowing constantly over their exterior surfaces. Thus the cooling action is applied practically directly to the point where the heat of reaction is generated.

In constructing an apparatus or plant in accordance with my invention, whether for use as a condensing or cooling system, or for an absorption apparatus, a sufficient number of units are arranged and connected one above another, the number of units being determined by the size or capacity of apparatus required. A suitable supporting framework (not shown) may be provided to give support to the sections. When required or desired a plurality of such stacks or 'towers' may be erected and connected together by suitable pipe connections so as to conduct the gas and liquids to them either in series or in parallel as circumstances may require. By reason of the unit construction of an apparatus embodying my invention, a section may be added or removed without materially affecting or disorganizing the apparatus as a whole. Also as the sections are of uniform construction, respectively, and will in practice be made in standard sizes, a section may be removed and replaced by another to remedy breakage or trouble, thus effecting great saving in cost of repairs and maintenance as well as of time consumed by shutting down the plant for repairs.

Various changes in details may be made from the particular form and construction of parts shown in the drawing without departing from the invention. For example, the form of the sections need not be strictly conical, nor their upper and lower walls parallel. The inclination or form of the surfaces over which the liquids flow may be changed to suit the character of liquids employed, and, as will be understood, the inclination of the lower surfaces of the sections will be such as to cause the liquid to follow such surface to its periphery before falling to the section below.

Claims:

1. A section or member for apparatus of the character described, said section comprising a hollow body having its upper and lower walls downwardly inclined, gas inlet and outlet connections to the interior of said body and means on the section for distributing a liquid over the exterior surfaces thereof.

2. A section or member for apparatus of the character described, said section comprising a hollow body having its upper and lower walls inclined from the centre to the periphery, inlet and outlet connections to the interior of said body and means on the section for distributing a cooling liquid over the exterior surfaces of both upper and lower walls.

3. A section or member for apparatus of the character described, said section comprising a hollow body having its upper and lower walls inclined from the centre to the periphery, a liquid overflow distributing receptacle on the upper part of the upper wall with means for distributing the overflow to both upper and lower walls, and inlet and outlet connections to the interior of said body.

4. A section or member for apparatus of the character described, said section comprising a hollow body having its upper and lower walls downwardly inclined from the centre to the periphery, a liquid distributing receptacle at the centre of the upper wall, a tube connecting said receptacle to the exterior surface of the lower wall, and inlet and outlet connections to the interior of said body.

5. A section or member for apparatus of the character described, said section comprising a hollow body having its upper and lower walls inclined from the centre to the periphery, a liquid overflow distributing receptacle on the upper portion of the section, means for dividing the overflow from said receptacle to both upper and lower walls, means for reuniting said flow at the lower portion of the section, and inlet and outlet connections to the interior of said section.

6. A section or member for apparatus of the character described, said section comprising a hollow body having upper and lower walls downwardly and outwardly inclined from the centre to the periphery, a liquid overflow distributing receptacle at the centre of the upper wall, a connection leading from said receptacle to the exterior surface of the lower wall, means for dividing the overflow from said receptacle to both walls, a flange at the periphery of said section for reuniting the overflow from both walls, and an inlet and outlet to the interior of said body.

7. A section or member for apparatus of the character described, said section comprising a hollow body having its upper and lower walls inclined downwardly from the periphery to the centre, a liquid overflow distributing receptacle extending around said periphery with means for distributing the overflow over both walls, a tube connecting the centre of upper wall to the lower wall, and inlet and outlet connections to the interior of the section.

8. A section or member for apparatus of the character described, said section comprising a hollow body having its upper and lower walls inclined from the centre to the periphery, means for introducing a liquid to the interior of said section, means for distributing said liquid over the lower wall, and means for flowing a liquid over the exterior surfaces of both upper and lower walls.

9. A section or member for apparatus of the character described, said section comprising a hollow body having its upper and lower walls inclined from the centre to the periphery, an inlet for delivering liquid onto the higher portion of the interior surface of the lower wall, means on the said surface for distributing the liquid over said surface, and a discharge outlet for said liquid.

10. A section or member for apparatus of the character described, said section comprising a hollow body having its upper and lower walls inclined from the center to the periphery, an inlet for delivering liquid onto the higher portion of the interior surface of the lower wall, a series of ribs on said surface for distributing said liquid, and means for introducing gas to the interior of said section.

11. Apparatus of the character described comprising a plurality of units of similar construction, each unit comprising a pair of hollow sections, the upper and lower walls of each section inclined downwardly and the said walls of one section inclined to their center in reverse direction to the said walls of the other section, means for flowing a liquid over the exterior surfaces of each section in succession, a gas inlet and outlet in each section, connections between the gas outlet of one section to the gas inlet of the other section, and a connection for leading the gas from one unit to the next.

12. Apparatus of the character described comprising one or more units of similar construction, each unit consisting of a pair of substantially conical hollow bodies having their bases in juxtaposition, a liquid overflow distributing receptacle on the upper apex of the unit with means for distributing the overflow therefrom to both upper and lower surfaces of the upper member of the pair, a flange on the periphery of said upper member, an overflow distributing trough on the periphery of the lower member of the pair and registering with said flange, means for distributing the overflow from said trough to both upper and lower surfaces of said lower member, a tube at the apex of the lower member for collecting the overflow from both its surfaces, said tube registering with the receptacle at the upper apex of the adjacent unit, and gas inlet and outlet connections in each member connected one to the other to conduct gas in succession from one member to the other.

13. Apparatus of the character described comprising one or more units of similar construction, each unit consisting of a pair of hollow bodies the upper and lower walls of each member of the pair being substantially conical, the members of the pair being arranged with their conical bases in juxtaposition, a liquid inlet near the apex of the upper member, a liquid inlet in the periphery of the lower member, a liquid outlet near the apex of the lower member, a liquid outlet in periphery of the upper member, means for distributing the liquid from said inlets over the interior surfaces of the lower walls of each member, connections between the respective outlets and inlets of the members, a gas inlet and outlet in each member and connections therebetween for leading gas successively from one member to the other.

14. Apparatus of the character described comprising a series of hollow sections having their upper and lower walls substantially conical, said sections arranged one above the other with their apexes directed alternately upward and downward to form a series of downwardly and reversely inclined exterior and interior surfaces, liquid receiving and distributing means on the upper part of the exterior surface, said means being arranged to receive the liquid coming from both exterior surfaces of the section next above, means to introduce a liquid to the upper part of the downwardly inclined interior surfaces in succession, and means for introducing a gas to the interior of said sections in succession in a direction counter to the flow of the liquids.

15. A section or member for apparatus of the class described, said section having downwardly inclined upper and lower walls, means for receiving cooling liquid and distributing the same to flow over said walls, a passage for said cooling liquid from one wall to the other through said section, a gas inlet to the interior of the section, and a gas outlet therefrom, said inlet and outlet being on opposite sides of said passage.

16. A section or member for apparatus of the class described, said section having downwardly inclined upper and lower walls, means for distributing a cooling liquid over the exterior surfaces of said section, a gas inlet extension on the lower wall and a gas outlet in the upper wall, said outlet recessed to receive the gas inlet extension of an adjacent section.

17. Apparatus of the character described comprising a plurality of superposed units, each of said units consisting of a pair of substantially cone-shaped sections arranged one above the other with their bases in juxtaposition, a liquid receiving and distributing receptacle at the apex of each of the upper sections, a liquid receiving and distributing channel at the periphery of each of the lower sections, a gas inlet and a gas outlet in each of said sections said inlets and outlets arranged to register respectively with the outlet and inlet of the adjacent sections above and below, connections between said outlets and inlets of the several sections and units, an acid inlet near the apex of each upper section, an acid outlet near the apex of each lower section, connections between the acid outlets and inlets of adjacent units, and acid connections between the peripheries of the sections of each pair, whereby cooling liquid delivered to the exterior of the uppermost section will flow over the exterior surfaces of each section in succession, acid delivered to the interior of the uppermost section will flow through each section in succession, and gas delivered to the lowermost section will flow through each section in succession in contact with the acid.

ARTHUR B. JONES.